US011905710B2

(12) United States Patent
Campau et al.

(10) Patent No.: US 11,905,710 B2
(45) Date of Patent: Feb. 20, 2024

(54) ROOFING ACCESSORIES WITH RADIOFREQUENCY RADIATION SHIELDING CAPABILITIES AND METHODS OF MAKING AND USE THEREOF

(71) Applicant: BMIC LLC, Dallas, TX (US)

(72) Inventors: Zachary Richard Campau, Novato, CA (US); Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/978,805

(22) Filed: Nov. 1, 2022

(65) Prior Publication Data

US 2023/0135637 A1 May 4, 2023

Related U.S. Application Data

(60) Provisional application No. 63/274,307, filed on Nov. 1, 2021.

(51) Int. Cl.
*E04D 1/30* (2006.01)
*H01Q 1/52* (2006.01)
(Continued)

(52) U.S. Cl.
CPC ............ *E04D 1/30* (2013.01); *D04H 1/4218* (2013.01); *D04H 1/4234* (2013.01);
(Continued)

(58) Field of Classification Search
None
See application file for complete search history.

(56) References Cited

U.S. PATENT DOCUMENTS 4,823,523 A 4/1989 Coupard et al.
5,276,277 A 1/1994 Hightower et al.
(Continued)

FOREIGN PATENT DOCUMENTS

CA 1299234 C 4/1992
JP 04-153034 A 5/1992
(Continued)

*Primary Examiner* — Joshua K Ihezie
(74) *Attorney, Agent, or Firm* — GREENBERG TRAURIG, LLP

(57) ABSTRACT

At least some embodiments of the present disclosure provide a roofing accessory that includes a radiofrequency radiation shielding non-woven fiber composite material. The radiofrequency shielding non-woven fiber composite material includes a first fiber type that includes a conductive material, where the radiofrequency shielding non-woven fiber composite material has a sufficient amount of the first fiber type so as to result, when the radiofrequency shielding non-woven fiber composite material is positioned on a roof structure, in the radiofrequency shielding non-woven fiber composite material allowing for shielding a predetermined percentage of electromagnetic radiation passing through the roof structure. The radiofrequency shielding non-woven fiber composite material includes a second fiber type that includes a non-conductive material. The first fiber type and the second fiber type are randomly dispersed within the radiofrequency shielding non-woven fiber composite.

13 Claims, 3 Drawing Sheets

(51) Int. Cl.
*E04D 1/22* (2006.01)
*E04D 12/00* (2006.01)
*E04D 7/00* (2006.01)
*D04H 1/4234* (2012.01)
*D04H 1/732* (2012.01)
*D04H 1/4218* (2012.01)
*D04H 1/64* (2012.01)
*E04B 1/92* (2006.01)

(52) U.S. Cl.
CPC ............... *D04H 1/732* (2013.01); *E04D 1/22* (2013.01); *E04D 7/00* (2013.01); *E04D 12/002* (2013.01); *H01Q 1/526* (2013.01); *D04H 1/64* (2013.01); *D10B 2101/20* (2013.01); *D10B 2505/18* (2013.01); *E04B 1/92* (2013.01); *E04B 2001/925* (2013.01); *E04D 2001/308* (2013.01)

(56) References Cited

U.S. PATENT DOCUMENTS 5,355,520 A 10/1994 Freeburg et al.
6,706,147 B2 3/2004 Peng et al.
6,785,512 B1 8/2004 Messano et al.
8,012,310 B2 * 9/2011 Wilson .................... B32B 5/022 162/131
9,708,221 B2 7/2017 Miyao et al.
10,000,922 B1 * 6/2018 Letts ..................... B32B 27/304
10,334,446 B2 6/2019 Ashrafi
2005/0124250 A1 * 6/2005 Wilson ................. D04H 1/4374 442/368
2005/0140042 A1 * 6/2005 Aisenbrey .............. H05K 3/101 264/105
2006/0040091 A1 * 2/2006 Bletsos ................ D06N 7/0094 428/137
2006/0074141 A1 * 4/2006 Hayner ..................... G21F 1/10 523/136
2008/0152867 A1 * 6/2008 Di Pede .................. B32B 5/024 427/256
2009/0208714 A1 * 8/2009 Currier ................... C04B 28/14 428/212
2010/0203290 A1 * 8/2010 Whitaker .............. E04D 13/002 428/144
2010/0247855 A1 * 9/2010 Bletsos ................... C23C 14/20 428/209
2011/0258956 A1 * 10/2011 Felton ....................... E04D 1/20 52/518
2014/0194020 A1 * 7/2014 Vliet ..................... C04B 24/085 428/221
2015/0174860 A1 * 6/2015 Ellis ........................ B32B 15/09 156/247
2015/0288321 A1 * 10/2015 Schick .............. H01L 31/02008 136/251
2018/0230291 A1 * 8/2018 Albertelli ................ C08L 79/08
2018/0282922 A1 * 10/2018 Carlyle .................... D01D 5/14
2019/0119847 A1 * 4/2019 Brabbs .................... E04D 13/16
2019/0225800 A1 * 7/2019 Kumar .................... C08L 75/04
2020/0113088 A1 4/2020 Hansen et al.
2020/0354955 A1 11/2020 Sinha Ray et al.
2021/0187925 A1 * 6/2021 Hill ........................... B32B 5/30
2022/0056696 A1 * 2/2022 Miller ........................ B32B 5/26
2022/0268027 A1 * 8/2022 Miller .................... D06N 3/042

FOREIGN PATENT DOCUMENTS

JP 2002246785 A 8/2002
KR 20070106438 A * 11/2007

* cited by examiner

ROOFING ACCESSORIES WITH RADIOFREQUENCY RADIATION SHIELDING CAPABILITIES AND METHODS OF MAKING AND USE THEREOF

CROSS-REFERENCE TO RELATED APPLICATIONS

The present application claims priority to U.S. Provisional Application 63/274,307, filed Nov. 1, 2021, which is hereby incorporated by reference in its entirety.

FIELD OF TECHNOLOGY

The present disclosure generally relates to radiofrequency (RF) radiation shielding capability of roofing accessories and methods of making and using thereof.

BACKGROUND OF TECHNOLOGY

As cellular telephones, mobile devices, and other wirelessly connected devices increase in number and user, RF radiation becomes more pervasive. This can interfere with other wireless devices. People may have a variety of other reasons for limiting exposure to RF radiation, including limiting interference, health reasons, peace of mind, etc.

SUMMARY OF DESCRIBED SUBJECT MATTER

In some embodiments, the present disclosure provides an article. The article includes a roofing accessory configured to be positioned on a roof structure; where the roofing accessory includes a radiofrequency radiation shielding non-woven fiber composite material; where the radiofrequency shielding non-woven fiber composite material includes: a first fiber type; where the first fiber type includes a conductive material; where the radiofrequency shielding non-woven fiber composite material has a sufficient amount of the first fiber type so as to result, when the radiofrequency shielding non-woven fiber composite material is positioned on the roof structure, in the radiofrequency shielding non-woven fiber composite material allowing for shielding a predetermined percentage of electromagnetic radiation passing through the roof structure; a second fiber type; where the second fiber type includes a non-conductive material; and where the first fiber type and the second fiber type are randomly dispersed within the radiofrequency shielding non-woven fiber composite.

In some embodiments, an article of the present disclosure may further include where the roofing accessory is a shingle.

In some embodiments, an article of the present disclosure may further include where the roofing accessory is a roofing underlayment.

In some embodiments, an article of the present disclosure may further include where the conductive material of the first fiber type includes copper.

In some embodiments, an article of the present disclosure may further include where the conductive material of the first fiber type includes aluminum.

In some embodiments, an article of the present disclosure may further include where the non-conductive material of the second fiber type includes glass fiber.

In some embodiments, an article of the present disclosure may further include where the roofing accessory is a sprayed on material that coats roofing accessories between the roofing accessory and the roof structure In some embodiments, an article of the present disclosure may further include where predetermined percentage of electromagnetic radiation includes is ninety-nine percent.

In some embodiments, the present disclosure provides an exemplary method for making a roofing accessory having non-woven fiber composite material that includes at least the following steps of providing a first fiber type including a conductive material; providing a second fiber type including a non-conductive material; forming a roofing accessory from a radiofrequency shielding non-woven fiber composite material including a mixture of the first fiber type and the second fiber type: where the first fiber type and the second fiber type are randomly dispersed within the radiofrequency shielding non-woven fiber composite; and where the radiofrequency shielding non-woven fiber composite material has a sufficient amount of the first fiber type so as to result, when the radiofrequency shielding non-woven fiber composite material is positioned on a roof structure, in the radiofrequency shielding non-woven fiber composite material allowing for shielding a predetermined percentage of electromagnetic radiation passing through the roof structure.

In some embodiments, a method of making an article of the present disclosure may further include where the roofing accessory is a shingle.

In some embodiments, a method of making an article of the present disclosure may further include where the roofing accessory is a roofing underlayment.

In some embodiments, a method of making an article of the present disclosure may further include where the conductive material of the first fiber type includes copper.

In some embodiments, a method of making an article of the present disclosure may further include where the conductive material of the first fiber type includes aluminum.

In some embodiments, a method of making an article of the present disclosure may further include where the non-conductive material of the second fiber type includes glass fiber.

In some embodiments, a method of making an article of the present disclosure may further include where forming the roofing accessory includes spraying the radiofrequency shielding non-woven fiber composite material in uncured state onto the roof structure on material to coat roofing accessories on the roof structure.

In some embodiments, a method of making an article of the present disclosure may further include where predetermined percentage of electromagnetic radiation includes is ninety-nine percent.

In some embodiments, the present disclosure provides for a roofing system including a plurality of shingles, each shingle including a radiofrequency radiation shielding non-woven fiber composite material including; a first fiber type including a conductive material; where the radiofrequency shielding non-woven fiber composite material has an amount of the first fiber type causing, when the radiofrequency shielding non-woven fiber composite material is positioned on a roof structure, the radiofrequency shielding non-woven fiber composite material to allow for shielding a percentage of electromagnetic radiation passing through the roof structure; a second fiber type; where the second fiber type includes a non-conductive material; and where the first fiber type and the second fiber type are dispersed within the radiofrequency shielding non-woven fiber composite material.

In some embodiments, the roofing system includes a plurality of first fibers of the first fiber type. In some embodiments, the plurality of first fibers are in a mesh configured, a cage configuration, or any combination thereof, and include pores based on a density of the plurality of first fibers.

In some embodiments, the roofing system includes a roofing underlayment. In some embodiments, at least one shingle of the plurality of shingles may be installed on the roofing underlayment.

In some embodiments, a density of the first fiber type may be substantially uniform throughout at least one shingle of the plurality of shingles.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
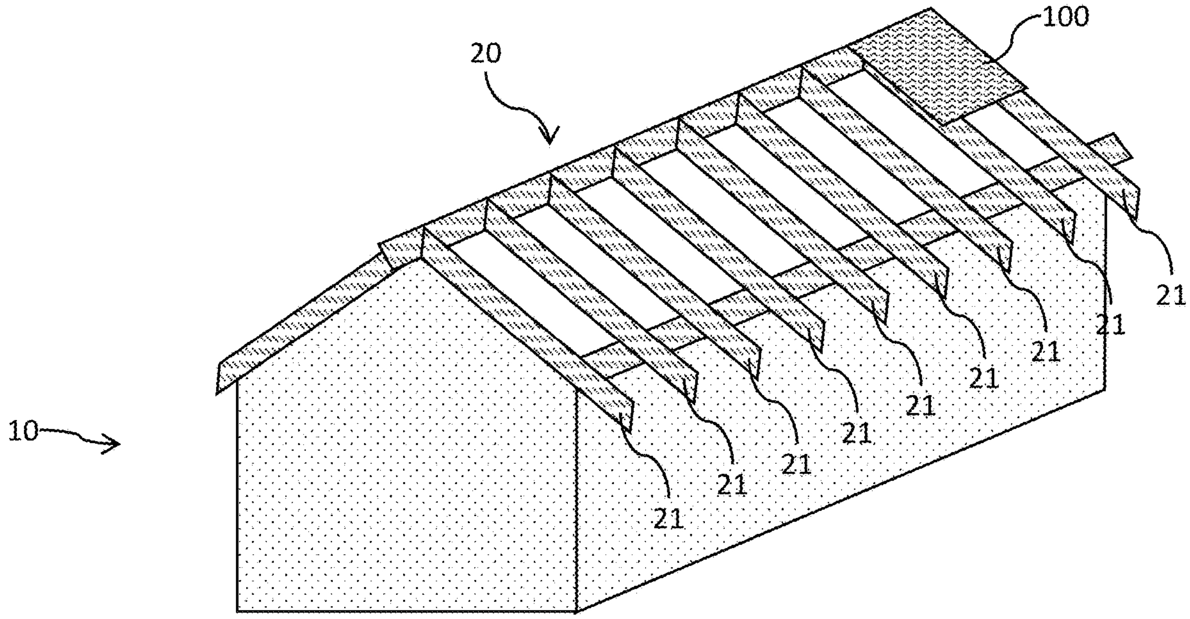
FIG. 1 illustrates a structure having an exemplary roofing accessory with RF shielding capability in accordance with some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The term "non-asphaltic underlayment" is used in the present disclosure to describe a roofing composite material containing no asphalt that is laid down on a roofing deck prior to shingle application.

In some embodiments, a roofing accessory of the present disclosure is positioned on a roof of a structure so as to present a barrier to one or more environmental conditions, including water, wind, snow, temperature, humidity, radio frequency signals, acoustics, among others or any combination thereof. In some embodiments, the roofing accessory may present such a barrier using one or more material(s), installation, methods of making, size, shape, construction or other structural and/or material feature described herein or any combination thereof.

Some embodiments of the present disclosure relate to at least one roofing accessory. Some embodiments of the present disclosure may include a plurality of roofing accessories. Some embodiments of the present disclosure may include at least three roofing accessories. Some embodiments of the present disclosure may include at least five roofing accessories. Some embodiments of the present disclosure may include at least ten roofing accessories. Some embodiments of the present disclosure may include at least fifty roofing accessories. Some embodiments of the present disclosure may include at least one hundred roofing accessories. Some embodiments of the present disclosure may include at least one-thousand roofing accessories.

In some embodiments, there may be 1 to 10,000 roofing accessories. In some embodiments there may be 1 to 5000 roofing accessories. In some embodiments, there may be 1 to 1000 roofing accessories. In some embodiments, there may be 1 to 100 roofing accessories. In some embodiments, there may be 1 to 50 roofing accessories. In some embodiments, there may be 1 to 25 roofing accessories. In some embodiments, there may be 1 to 10 roofing accessories. In some embodiments, there may be 1 to 5 roofing accessories. In some embodiments, there may be 1 to 2 roofing accessories.

In some embodiments, there may be 2 to 10,000 roofing accessories. In some embodiments, there may be 5 to 10,000 roofing accessories. In some embodiments, there may be 10 to 10,000 roofing accessories. In some embodiments, there may be 50 to 10,000 roofing accessories. In some embodiments, there may be 100 to 10,000 roofing accessories. In some embodiments, there may be 500 to 10,000 roofing accessories. In some embodiments, there may be 1000 to 10,000 roofing accessories. In some embodiments, there may be 5000 to 10,000 roofing accessories.

In some embodiments, there may be 2 to 5000 roofing accessories. In some embodiments, there may be 5 to 1000 roofing accessories. In some embodiments, there may be 10 to 5000 roofing accessories. In some embodiments, there may be 50 to 100 roofing accessories. In some embodiments, there may be 60 to 90 roofing accessories. In some embodiments, there may be 70 to 80 roofing accessories.

Non-limiting examples of roofing accessories may include, without limitation, roofing caps, laminate roofing accessories, roofing sheets, ridge caps, ridge vents, roofing frames, shingles, waterproofing membranes, underlayment, tiles, photovoltaic panels, and the like, or any combination thereof. In some embodiments, the roofing accessories may include applied and/or sprayed on coating and/or materials, such as any suitable, e.g., paint, lacquer, spray-on polymer, asphalt, insulation, non-woven fiber composite, or other spray-on coating/material or any combination thereof.

Figure 2:
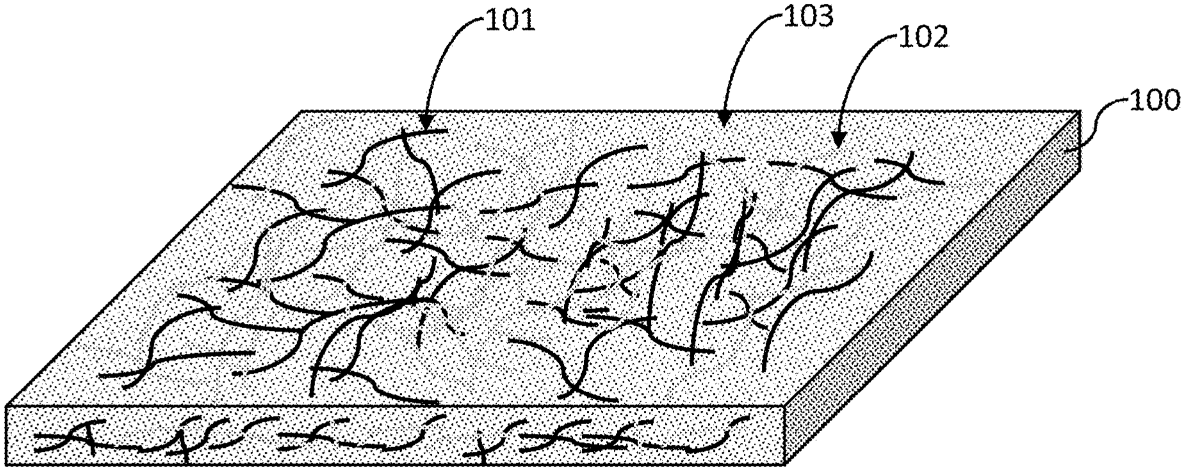
FIG. 2 illustrates an exemplary roofing accessory with RF shielding capability RF radiation shielding non-woven fiber composite material in accordance with one or more embodiments of the present disclosure.
Figure 3:
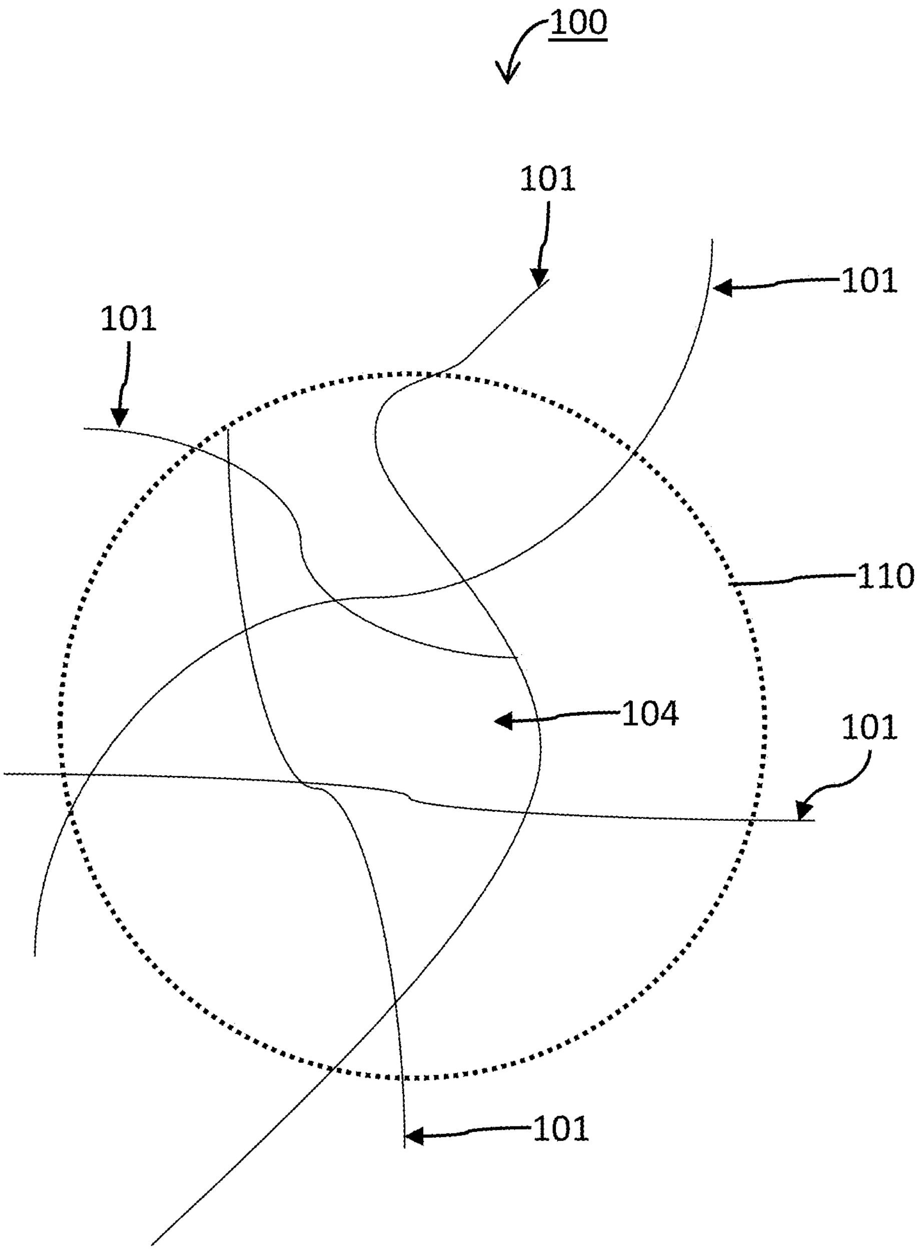
FIG. 3 illustrates pores formed by first fibers of a first fiber type of a RF shielding non-woven fiber composite material in accordance with one or more embodiments of the present disclosure.

FIGS. 1 through 3 illustrate roofing accessories with RF shielding capabilities, such as RF blocking capability, by preventing external radio waves from penetrating the structure, and/or RF reflecting capability, by reflecting radio waves away from the structure. The following embodiments provide technical solutions and technical improvements that overcome technical problems, drawbacks and/or deficiencies in the technical fields involving roofing materials and RF radiation shielding. As explained in more detail, below, technical solutions and technical improvements herein include, without limitation, having non-woven fiber composite material with RF radiation shielding capabilities (properties) to be included in any roofing or building materials that may be utilized to form structure/building-related items, including, but not limited to, roofing accessories such as shingles, rolled material, underlayment, siding, insulation, etc. For example, as used herein, term "RF radiation shielding roofing accessory" refers to a roofing accessory that includes a RF radiation shielding non-woven fiber composite material. In some embodiments of the present disclosure, an illustrative RF radiation shielding non-woven fiber composite material may include metal fibers. In some embodiments, an illustrative RF radiation shielding non-woven fiber composite material may include metal fibers and/or inclusion of other materials having radiofrequency radiation shielding (e.g., absorbing, reflecting, attenuating or otherwise excluding) characteristics for various radio communication frequencies. Such illustrative RF radiation shielding non-woven fiber composite materials of the present disclosure may provide insolation from 5G and/or other desired radio frequencies, radio interference prevention, radio security, and/or signal reflection to reduce interference within the structure and/or improve coverage within a structure (e.g., building), mitigate health concerns due to excess radio frequency signals, among other improvements. In some embodiments, as detailed herein, a sufficient amount of materials having radiofrequency radiation shielding characteristic(s) in the illustrative RF radiation shielding non-woven fiber composite material may be tailored based at least in part on a particular radio communication frequency or a range of radio communication frequencies to be shielded from.

FIG. 1 illustrates an exemplary RF radiation shielding roofing accessory including RF radiation shielding non-woven fiber composite material in accordance with one or more embodiments of the present disclosure.

In some embodiments, one or more RF radiation shielding roofing accessory 100 may be installed on a roof structure 20 of a structure 10. In some embodiments, the structure 10 may include any roofed structure, such as, e.g., a house, condominium, townhouse, or other residential structure, office building, factory, plant, or other commercial/industrial structure, bus stop, train station, airport terminal, shed, awning, or any other suitable roofed structure 10.

In some embodiments, the roof structure 20 may include one or more support structures, such as, e.g., one or more roof supports 21 including, e.g., beams, posts, frames, paneling, or other suitable roof support or any combination thereof. In some embodiments, the RF radiation shielding roofing accessory 100 may be mounted on the one or more roof supports 21, either directly or indirectly (e.g., via intervening layers, accessories, accessories, materials etc. such as decking, underlayment, waterproof membrane, insulation, etc.). In some embodiments, the RF radiation shielding roofing accessory 100 may be attached to one or more roof supports 21 using one or more suitable attachment mechanisms such as, without limitation, fasteners (e.g., nails, screws, pins, rivets), adhesives, clips, clamps, or any other suitable attachment mechanisms or any combination thereof. In some embodiments, the RF radiation shielding roofing accessory 100 may be coated with asphalt before, during, or after installation. In some embodiments, the RF radiation shielding roofing accessory 100 may be mounted on, under, or within one or more other roofing accessory.

In some embodiments, the RF radiation shielding roofing accessory 100 include decking to form a roof deck, and a roofing underlayment and one or more shingles are laid-up on the uppermost layer of the decking. In some embodiments, the roofing underlayment may be applied to the decking and thereafter the shingle is secured to the roofing supports 21. Types of shingles that can be used in the present disclosure include but are not limited to asphalt-containing shingle or multi-ply shingles.

In some embodiments, the RF radiation shielding roofing accessory 100 include a roofing underlayment, and one or more shingles are laid-up on the uppermost layer of the roofing underlayment and thereafter the shingle is secured to the roofing supports 21. Types of shingles that can be used in the present disclosure include but are not limited to asphalt-containing shingle or multi-ply shingles.

In some embodiments, the RF radiation shielding roofing accessory 100 include one or more shingles. In some embodiments, the one or more shingles are laid-up on the uppermost layer of a roofing underlayment applied to the roofing supports 21. Thereafter the shingle is secured to the roofing supports 21.

In some embodiments, the RF radiation shielding roofing accessory 100 may include an applied and/or sprayed on coating and/or materials, such as any suitable, e.g., one or more fibers sprayed on the roof structure 20, e.g., as a dry mixture of non-woven fibers, as a wet mixture of non-woven fibers (e.g., suspended in a fluid such as water, curable resin, asphalt, polymer, etc.), or by any other suitable spraying technique. In some embodiments, the mixture, whether wet or dry, may be sprayed onto the roof structure 20 over roofing accessories such as shingles or underlayment, between roofing accessories (e.g., between shingles and a solar panel, between an underlayment and shingles, between roofing decking and shingles, between roof decking and underlayment), or under/beneath roof decking of the roof structure 20 (e.g., on an underside of the roof decking). For example, the mixture may include fibers mixed into an uncured resin and/or polymer, and may be sprayed onto the roof structure 20 with the resin and/or polymer in the uncured state such that the resin and/or polymer may cure on the roof structure 20 to form the RF radiation shielding roofing accessory 100.

In some embodiments, the RF radiation shielding roofing accessory 100 may be configured to shield against RF radiation incident to the roofing supports 21, such as via shielding, shielding, shielding, shielding or otherwise prevent the RF radiation from entering the roofing supports 21. Accordingly, in some embodiments, the RF radiation shielding roofing accessory 100 may include RF shielding material including an RF shielding non-woven fiber composite.

In some embodiments, the RF shielding non-woven fiber composite material may include first fibers 101 of a first fiber type that conducts electric charges of the electrical field created by RF signals. As a result, the first fibers 101 distributes the electric charges across a mesh of first fibers

101 formed by the distribution of the first fibers 101 throughout the RF radiation shielding roofing accessory 100, thus cancelling at least a portion of the electrical field of the RF signals and thereby isolating an interior of the structure 10 from external RF signals. In some embodiments, the RF shielding non-woven fiber composite material may include first fibers 101 of the first fiber type that shields at least a portion of RF radiation. In some embodiments, the RF shielding non-woven fiber composite material may include first fibers 101 of the first fiber type that shields at least a portion of RF radiation. In some embodiments, the RF shielding non-woven fiber composite material may include first fibers 101 of the first fiber type that is impermeable to RF radiation, thus shielding the RF radiation.

In some embodiments, the degree to which RF radiation is shielded by the RF radiation shielding accessory 100 is a function of the density of the first fibers 101 and the thickness of the RF radiation shielding accessory 100. For example, skin depth and/or skin effect may be a mechanism by which the first fibers 101 shield RF radiation. According to the skin effect/skin depth, the thickness of the RF radiation shielding accessory 100 is proportional to the frequency of the RF radiation that is excluded. Thus, the frequency of the RF signals that the RF radiation shielding accessory 100 is configured to exclude may be shielded against based on the first fiber type, the density of the first fibers 101 and/or the thickness of the RF radiation shielding accessory 100.

In some embodiments, to facilitate the isolation, one or more of the RF radiation shielding roofing accessory 100 may be installed continuously across the roofing structure 20. In some embodiments, walls and/or other exterior surfaces of the structure 10 may also have the RF radiation shielding non-woven fiber composite material installed thereon to completely enclose the structure 10 and facilitate shielding of the RF radiation. In some embodiments, the structure 10 may ground the RF radiation shielding non-woven fiber composite material of the RF radiation shielding roofing accessory 100 via, e.g., a suitable grounding component or grounding wire. In some embodiments, an example of shielding radiation may include the gradual loss of flux intensity of electromagnetic radiation through a medium.

In some embodiments, the first fibers 101 of the RF radiation shielding non-woven fiber composite material may be provided in a density to produce a first fiber mesh with a fineness sufficient to shield against a selected frequency or frequencies of electromagnetic radiation including RF radiation, as will be described further below. In some embodiments, the RF radiation shielding non-woven fiber composite material may be configured to shield against additional or alternative electromagnetic radiation, such as, e.g., X-rays, gamma rays, or other suitable portion of the electromagnetic spectrum or any combination thereof.

FIG. 2 illustrates an exemplary roofing accessory including an RF radiation shielding non-woven fiber composite material in accordance with one or more embodiments of the present disclosure. FIG. 3 illustrates pores 104 formed by first fibers 101 of a first fiber type of the RF radiation shielding non-woven fiber composite material in accordance with one or more embodiments of the present disclosure.

In some embodiments, the RF radiation shielding roofing accessory 100 may be a non-woven fiber-reinforced material including a fiber component and a binder component. In some embodiments, the matrix is a tough but relatively weak material that is reinforced by stronger stiffer reinforcing filaments or fibers of the fiber component. The extent that strength and elasticity are enhanced in a fiber-reinforced material depends on the mechanical properties of both the fiber component and the binder component, their volume relative to one another, and the fiber length and orientation within the matrix. In some embodiments, the fiber component includes one or more fibers for reinforcing RF shielding.

In some embodiments, the fiber component may include one or more layers of fabric of woven fibers, one or more layers of directionally oriented fibers (e.g., each layer alternating in direction, e.g., by 90 degrees, by 60 degrees, by 45 degrees, by 30 degrees, by 20 degrees, by 10 degrees, or by any other suitable degree of rotation or any combination thereof), one or more layers of non-woven fiber mats, or any combination thereof.

In some embodiments, the fiber component may include one or more types of fibers to provide strength, elasticity, RF shielding or any other suitable characteristic or any combination thereof. In some embodiments, the provide RF shielding, the fiber component may include first fibers 101 of a first fiber type. In some embodiments, the first fibers 101 may be selected to provide RF shielding characteristics.

The EM spectrum ranges from very low frequencies, such as 60 cycles per second (called Hertz, abbreviated Hz) of power lines to very high frequencies, such as 40 billion cycles per second (called Gigahertz, abbreviated GHz) of microwave communications systems. The frequencies of lasers and optical devices are almost a million times greater in frequency. In some embodiments, the RF radiation shielding roofing accessory 100 may utilize the first fibers 101 to target part of the RF portion of the EM spectrum, such as those parts that are utilized by commercial wireless carriers. This RF spectrum ranges roughly from 800 MHZ to 2400 MHZ. However, by varying the quantity and/or density of the first fiber 101 in the roofing component, different portions of the EM spectrum may be targeted instead or in addition to the RF spectrum, such as any frequency in the range of 10 KHz to 100 GHz, and by varying the thickness of the RF radiation shielding roofing accessory 100 and the quantity and/or density of the first fiber 101, the degree of shielding may be selected.

In order to reduce EM radiation, the first fibers 101 are provided based on the principles of wave effects on the surface of a solid. Part of a wave, called a transmitted wave, passes into the solid while another part of the wave is shielded from the surface of the solid, at angle. The transmitted wave 15 is also called a refracted wave. By shielding a greater portion of Electromagnetic radiation, a much smaller portion is transmitted or refracted, thus reducing the wave strength of the Electromagnetic radiation. With a sufficient reduction of the wave strength signal, the Electromagnetic radiation may be effectively shielded against. In some embodiments, the Electromagnetic radiation may be sufficiently reduced when the wave strength in the structure 10 from an external Electromagnetic radiation sufficiently low so as to render a computing device that uses the Electromagnetic radiation to be unable to use the Electromagnetic radiation.

Accordingly, in some embodiments, the first fiber 101 may be formed of a first fiber type, including a radiation shielding material, such as a conductive material. In some embodiments, the radiation shielding material may include, e.g., a metal such as copper, aluminum, gold, silver, platinum, iron, steel, nickel, cobalt, or other conductive metal and/or alloys thereof, a conductive non-metal, such as, carbon or a carbon allotrope (e.g., graphite, graphene, carbon nanotubes, etc.), a doped semi-conductor such as doped silicon, doped germanium, doped silicon-germanium, or other semi-conductor doped with one or more dopants including, e.g., aluminum, indium, gallium, boron, phosphorous, arsenic, antimony, bismuth, lithium, or other suitable dopant or any combination thereof.

The first fiber 101 may include one or more individual fiber filaments having an average length in the range of, but not limited to, from about 3 to about 140 mm, and an average diameter in the range of, but not limited to, from about 5 to about 25 micrometers. Short and long fibers can be mixed to form a mat web of increased fiber entanglement. In some embodiments, however, that the fibers may be in another form, such as, for example, a continuous strand or strands.

In some embodiments, the material of the first fiber type may be expensive, fragile, volatile, or otherwise structurally unsuitable for installation on a roof structure 20 on its own. Thus, by using first fibers 101 of the material in a matrix to form a non-woven composite, the conductive and electromagnetic shielding characteristics of the material may be incorporated into a tough, inexpensive, non-conductive binder. Moreover, in some embodiments, the first fibers 101 may be mixed with second fibers 102 of a second fiber type in order to further reinforce the RF radiation shielding roofing accessory 100.

In some embodiments, the first fibers 101 are mixed and evenly distributed throughout the RF radiation shielding non-woven fiber composite material of the RF radiation shielding roofing accessory 100 such that there is uniform or substantially uniform density of first fibers 101 throughout the RF radiation shielding roofing accessory 100. Accordingly, the mat web of entangled first fibers 101 forms a mesh or cage of conductive material having pores 104 with an average diameter based on the density of the first fiber 101. In certain embodiments, the mat web may form a mesh configuration or formation, a cage configuration or formation, or any combination thereof. As more first fiber 101 is added, the density is increased, and the pores 104 decrease in size. In some embodiments, evenly distributed may be defined as having each first fiber being substantially equally spaced apart from other first fibers in the RF radiation shielding non-woven fiber composite material.

The probability of a given electromagnetic wave passing through the mat web of entangled first fibers 101 is based on the wavelength of the electromagnetic wave, the size of the pores 104 and the thickness of RF radiation shielding non-woven fiber composite, and the size of the pores 104 are based on the density of the first fibers 101 in the RF radiation shielding non-woven fiber composite.

The relationship between the frequency and the wavelength of electromagnetic radiation is:

$$C=(\text{Wavelength})\times(\text{Frequency}),$$

where C=the speed of light.

For example, this calculation indicates that the wavelength of an 800 MHZ Electromagnetic radiation is 14.76 inches (375 mm) and the wavelength of a 2400 MHZ Electromagnetic radiation is 4.92 inches (125 mm).

Indeed, where the pores 104 are smaller than the wavelength of the electromagnetic wave, the electromagnetic wave is unlikely to pass through a pore 104 and would be more likely to strike a first fiber 101. For example, for pores 104 smaller 375 millimeters, an 800 MHz Electromagnetic radiation may be more likely to be shielded by a first fiber 101. The first fiber 101 may then shield the electromagnetic wave and disperse the electrical charge via the entangled first fibers 101. Accordingly, the first fibers 101 may cause shielding of electromagnetic radiation, including RF signals, based on the amount of the electromagnetic radiation shielded by the first fibers 101. The shielding can be tuned to a particular frequency range and particular level of shielding based on the material of the first fiber type and density of the first fibers 101 to adjust absorptivity of the first fibers 101 and the size of the pores 104, respectively.

Accordingly, in some embodiments, a sufficient amount of first fibers 101 of the first fiber type may be defined by pore 104 size and a target wavelength. The RF portion of the electromagnetic spectrum ranges from around 20 kHz to around 300 GHz, which equates to wavelengths in the range from around 1,000 kilometers (km) to around 1 millimeter (mm). Thus, the pores 104 may be designed to have a size of 1 mm or less. Thus, the quantity of the first fiber type may be an amount of first fibers 101 with a density across the RF radiation shielding roofing accessory 100 that results in pores 104 of 1 mm or less.

In some embodiments, a percentage of each electromagnetic wave that is shielded by a first fiber 101 may be a result of the material of the first fiber 101 (e.g., element/alloy/compound and/or fiber diameter), the amount of the first fiber 101 and the thickness of the RF radiation shielding roofing accessory 100. As more first fibers 101 of the first fiber type are present, a greater amount of each electromagnetic wave may be shielded. Similarly, for a thicker RF radiation shielding roofing accessory 100, more of each electromagnetic wave may be shielded. Thus, the RF radiation shielding roofing accessory 100 and the quantity of first fibers 101 may be designed to target a predetermined percentage of shielding effectiveness of electromagnetic radiation, for example to balance size, materials, cost and shielding effectiveness. In some embodiments, the predetermined percentage may be, e.g., 50% or great, 55% or greater, 60% or greater, 65% or greater, 70% or greater, 75% or greater, 80% or greater, 85% or greater, 90% or greater, 95% or greater, 97% or greater, 98% or greater, 99% or greater, or other suitable percentage.

In some embodiment, shielding may include a reduction in a signal decibel level, where shielding effectiveness may be measured according to the signal decibel level relative to a signal shielding threshold. For example, a reduction of, e.g., 20 decibel (dB) would reduce the strength of an electromagnetic signal by 99 percent. Accordingly, in some embodiments, the shielding effectiveness may be target metric, where a target for the shielding effectiveness may be, e.g., 5-10 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, 25 dB-50 dB, or other suitable signal shielding threshold.

In some embodiments, the second fibers 102 of the present RF radiation shielding non-woven fiber composite material may include a second fiber type. In some embodiments, the second fiber type may include a structural reinforcement to provide enhanced structural characteristics to the RF radiation shielding roofing accessory 100. In some embodiments, the second fibers 102 may be omitted where structural reinforcement is undesired. In some embodiments, the second fiber type may include an electrical, acoustic and/or thermal protective material to provide enhanced electrical, acoustic and/or thermal characteristics to the RF radiation shielding roofing accessory 100, such as, e.g., increased electrical insulation (e.g., via an insulator and/or dielectric material), increased acoustic insulation, increased thermal insulation, improved fire-retardant capabilities, or other characteristics or any combination thereof. In some embodiments, the second fibers 102 may be omitted where electrical, acoustic and/or thermal enhancement is undesired. Accordingly, in some embodiments, the second fibers 102 may include a suitable non-conductive material for structural reinforcement, electrical, acoustic and/or thermal enhancement or other reinforcement and/or enhancement, such as, e.g., fibers of glass, wood pulp or particles, cellulose, polyethylene, polypropylene, polyester, Nylon®, Orlon® or mixtures of these fibers depending on the end use of the product. More specifically, for roofing shingles, acoustical boards, BUR and other asphaltic composites at least a major portion of glass fibers are employed, such as unmixed glass fibers. For facers or underlayment used in different articles of building construction, e.g., divider panels, other synthetic fibers or wood chips fixed in an RF radiation shielding non-woven fiber composite material can be utilized.

The second fiber 102 may include one or more individual fiber filaments having an average length in the range of, but not limited to, from about 3 to about 140 mm, and an average diameter in the range of, but not limited to, from about 5 to about 25 micrometers. Short and long fibers can be mixed to form a mat web of increased fiber entanglement. In some embodiments, however, that the fibers may be in another form, such as, for example, a continuous strand or strands.

Similarly, the second fibers 102 may be mixed and evenly distributed throughout the RF radiation shielding non-woven fiber composite material of the RF radiation shielding roofing accessory 100 such that there is uniform density of the second fibers 102 throughout the RF radiation shielding roofing accessory 100. In some embodiments, evenly distributed may be defined as having each second fiber being substantially equally spaced apart from other second fibers in the RF radiation shielding non-woven fiber composite material.

In some embodiments, the RF shielding non-woven fiber composite material of the RF radiation shielding roofing accessory 100 may shield against electromagnetic signals based on the amount of first fibers 101. In some embodiments, the radiofrequency shielding non-woven fiber composite material of the RF radiation shielding roofing accessory 100 may have a sufficient amount of first fibers 101 of the first fiber type so as to result, when the radiofrequency shielding non-woven fiber composite material is positioned on the roof structure 20, in the RF radiation shielding roofing accessory 100 allowing for shielding a predetermined amount of electromagnetic radiation from passing through the roof structure.

In some embodiment, the fiber mat may further include a filler, e.g., less than about 0.5%, based on the fiber weight. A fiber mixture may be optional for construction material application, such as, for example, roofing and siding, because excessive amounts of filler may reduce porosity and vapor ventability of the fiber mat.

In some embodiments, the RF radiation shielding non-woven fiber composite material may include a binder 103 as the matrix to carry the first fibers 101, the second fibers 102 or both. In some embodiments, the binder may include a thermosetting resin of formaldehyde in combination with urea, phenol, resorcinol, melamine or mixtures thereof. In some embodiments, the binder 103 may include a binder modifying amount of a styrene/acrylic resin containing a polyfunctional component which crosslinks with the copolymer resin during curing of the mat. The styrene component of the resin can be unsubstituted or substituted on a ring carbon atom with lower alkyl, vinyl, allyl, chloro and/or phenyl. For example, notwithstanding the reduced flammability and high thermal stability of some of these substituted types, unsubstituted styrene may be utilized. In some embodiments, the styrene/acrylic resin, which may include both acrylic and methacrylic moieties and mixtures thereof, contains a minor amount, e.g. between about 0.05 to 10 wt. %, such as between about 0.1 and about 5 wt. %, of a crosslinking agent which may be a nitrogen containing crosslinking agent, such as a polyfunctional amine, amide or acrylonitrile, or may be any other polyfunctional crosslinking agent such as, for example without limitation, a di- or tri-olefinically unsaturated hydrocarbon or other conventional crosslinker reactive with the styrene/acrylic copolymer. In some embodiments, the (meth)acrylic polymer may generally include a mixture of (meth)acrylates and additionally may contain (meth)acrylonitriles, (meth)acrylic acid and/or (meth)acrylamides as comonomers. For example, in some embodiments, the present modified binder may allow for curing at a lower temperature than would otherwise be required for a RF radiation shielding non-woven fiber composite material containing siloxane/formaldehyde type binder 103 alone. In some embodiments, the styrene comonomer may contribute a degree of flexibility.

In the finished RF radiation shielding roofing accessory 100 including the cured RF radiation shielding non-woven fiber composite, the fiber content of the first fibers 101 and the second fibers 102 may be in the range of from about 55 wt. % to about 98 wt. %. In one embodiment of the present disclosure, the fiber content may be in the range of from about 70 wt. % and about 85 wt. %. As described herein, the first fibers 101 may have a content sufficient to shield against electromagnetic radiation, which may be less than the total fiber content. Because the first fibers 101 may increase weight and costs, and/or may reduce mechanical reinforcement, the difference between the quantity of the first fibers 101 and the total fiber content may be a quantity of the second fibers 102. In some embodiments, the first fibers 101 and the second fibers 102 may be uniformly mixed together to have a constant ratio of first fibers 101 to second fibers 102 per unit volume.

In some embodiments, the first fibers 101 and the second fibers 102 may be randomly dispersed within the RF radiation shielding non-woven fiber composite. For example, the RF radiation shielding non-woven fiber composite material in accordance with one embodiment of the present disclosure may further include a fiber dispersing agent for dispersing the plurality of fibers in the fixative composition. The fiber dispersing agent may include, for example, tertiary amine oxides (e.g. N-hexadecyl-N,N-dimethyl amine oxide), bis(2-hydroxyethyl) tallow amine oxide, dimethyl hydrogenated tallow amine oxide, dimethylstearyl amine oxide and the like, and/or mixtures thereof. In some embodiments, other dispersing agents may be used. The dispersing agent may include a concentration in the range of from about 10 ppm to about 8,000 ppm, based on the amount of fiber. The dispersing agent may include a concentration in the range of from about 200 ppm to about 1,000 ppm, based on the amount of fiber.

In one embodiment, the RF radiation shielding non-woven fiber composite material may further include one or more viscosity modifiers. The viscosity modifier may be adapted to increase the viscosity of the binder and/or the fixative composition such that the settling time of the fibers is reduced, and the fibers may be dispersed. The viscosity modifier may include, but is not limited to, hydroxyl ethyl cellulose (HEC), polyacrylamide (PAA), and the like. other viscosity modifiers may be used without departing from the scope and spirit of the present disclosure.

Example Method of Making the RF Radiation Shielding Roofing Accessory 100

The process of making the RF radiation shielding non-woven fiber composite material in accordance with one embodiment of the present disclosure may include a wet-laid process. It is contemplated, however, that other processes, such as, for example, a dry-laid process, may be used without departing from the scope and spirit of the present disclosure. Furthermore, the process is described using chopped bundles of fibers. As discussed above, however, other types of fiber content may be utilized, such a single continuous fiber strand.

In some embodiments, the binder 103 may be prepared by blending a binder material and a polyurethane modifier in water, under agitation until a uniform mixture is obtained where the first fibers 101 and the second fibers 102 are randomly dispersed throughout the mixture. The resulting aqueous mixture may then be used to saturate the wet mat of dispersed fibers, after which excess mixture may be removed before drying and curing at an elevated temperature. In some embodiments, a viscosity modifier or other process aid may also be added to the water/dispersant agent medium. From about 0.05 to about 0.5 wt. % viscosity modifier in white water may be added to the dispersant to form the aqueous mixture. In some embodiments, an aqueous mixture of the binder 103 alone may be prepared and applied to the wet mat of dispersed fibers, in which case the polyurethane may be separately and subsequently applied by spraying, dipping or other means. In some embodiments, all or a portion of the polyurethane modifier may be applied over the mat after initiation of the drying and/or curing process.

The first fibers 101 and/or the second fibers 102 may be sized or unsized, and may be wet or dry, as long as they are capable of being suitably dispersed in the water/dispersant agent medium. The aqueous mixture, containing from about 0.03 wt. % to about 8 wt. % solids, is then agitated to form a workable dispersion at a suitable and uniform consistency. The aqueous mixture may be additionally diluted with water to a lower fiber concentration to between about 0.02 wt. % and about 0.08 wt. %. In one embodiment, the fiber concentration may be diluted to about 0.04 wt. % fiber. The aqueous mixture is then passed to a mat-forming machine such as a wire screen or fabric for drainage of excess water. The excess water may be removed with the assistance of vacuum.

In some embodiments, the first fibers 101 and the second fibers 102 of the aqueous mixture are deposited on the wire screen and drained to form a wet fiber mat. The wet mat may then be saturated by soaking in an aqueous solution of binder or binder/modifier fixative composition. The aqueous solution may include, for example, from about 10 wt. % to about 40 wt. % solid. The wet mat may be soaked for a period of time sufficient to provide the desired fixative for the fibers. Excess aqueous binder or binder/modifier composition is then removed, such as under vacuum to form an uncured RF radiation shielding non-woven fiber composite.

In some embodiments, after treatment with the binder material or binder/modifier composition, if desired, the RF radiation shielding non-woven fiber composite material is then dried and the fixative composition may be cured in an oven at an elevated temperature. A temperature in the range of about 160° C. to about 400° C., for at least about 2 seconds, may be used for curing. In one embodiment, a cure temperature in the range of about 225° C. to about 350° C. may be used. It is contemplated that in an alternative embodiment of the present disclosure, catalytic curing may be provided with an acid catalyst, such as, for example, ammonium chloride, p-toluene sulfonic acid, or any other suitable catalyst. As discussed above, any amount of modifier not included with the binder 103 may be applied to the drained fiber slurry, the drained mat including the binder 103, and/or the cured product. The modifier may be applied as a polyurethane spray and/or as a bath as an aqueous solution of the polyurethane.

In some embodiments, the RF radiation shielding roofing accessory 100 of the present disclosure can also be coated or sprayed with an algaecide such as, for example, zinc powder, or copper oxide powder; a herbicide; an antifungal material such as MICRO-CHEK 11P; an antibacterial material such as MICRO-CHEK 11-S-160; a surface fiction agent such as BYK-375, a flame retardant material such as ATH (aluminum trihydrate) available from, e.g., Akzo Chemicals and antimony oxide available from, e.g., Laurel Industries and/or a coloring dye such as T-1133A and iron oxide red pigments, and other products which can impart specific surface functions. The MICRO-CHEK products are available from the Ferro Corporation of Walton Hills, Ohio. BYK-375 may be obtained from Wacker Silicone Corporation of Adrian, Mich. and T-1133A is sold by Abco Enterprises Inc. of Allegan, Mich. The additional coatings of, e.g., water repellent material, antifungal material, antibacterial material, etc., may be applied to one or both sides of the RF radiation shielding roofing accessory 100.

Having generally described various embodiments of the present disclosure, reference is now made to the following examples which illustrate embodiments of the present disclosure and comparisons to a control sample. The following examples serve to illustrate, but are not to be construed as limiting to, the scope of the disclosure as set forth in the appended claims.

The aforementioned examples are, of course, illustrative and not restrictive.

At least some aspects of the present disclosure will now be described with reference to the following numbered clauses.

1. An article including:
 - a roofing accessory configured to be positioned on a roof structure;
 - where the roofing accessory includes a radiofrequency radiation shielding non-woven fiber composite material;
 - where the radiofrequency shielding non-woven fiber composite material includes:
 - a first fiber type;
 - where the first fiber type includes a conductive material;
 - where the radiofrequency shielding non-woven fiber composite material has a sufficient amount of the first fiber type so as to result, when the radiofrequency shielding non-woven fiber composite material is positioned on the roof structure, in the radiofrequency shielding non-woven fiber composite material allowing for shielding a predetermined percentage of electromagnetic radiation passing through the roof structure;
 - a second fiber type;
 - where the second fiber type includes a non-conductive material; and where the first fiber type and the second fiber type are randomly dispersed within the radiofrequency shielding non-woven fiber composite.
2. The article as recited in clause 1, where the roofing accessory is a shingle.
3. The article as recited in clause 1, where the roofing accessory is a roofing underlayment.
4. The article as recited in clause 1, where the conductive material of the first fiber type includes copper.
5. The article as recited in clause 1, where the conductive material of the first fiber type includes aluminum.

6. The article as recited in clause 1, where the non-conductive material of the second fiber type includes glass fiber.
7. The article as recited in clause 1, where the roofing accessory is a sprayed on material that coats roofing accessories between the roofing accessory and the roof structure
8. The article as recited in clause 1, where predetermined percentage of electromagnetic radiation includes is ninety-nine percent.
9. A method including:
providing a first fiber type including a conductive material;
providing a second fiber type including a non-conductive material;
forming a roofing accessory from a radiofrequency shielding non-woven fiber composite material including a mixture of the first fiber type and the second fiber type:
where the first fiber type and the second fiber type are randomly dispersed within the radiofrequency shielding non-woven fiber composite; and
where the radiofrequency shielding non-woven fiber composite material has a sufficient amount of the first fiber type so as to result, when the radiofrequency shielding non-woven fiber composite material is positioned on a roof structure, in the radiofrequency shielding non-woven fiber composite material allowing for shielding a predetermined percentage of electromagnetic radiation passing through the roof structure.
10. The method as recited in clause 9, where the roofing accessory is a shingle.
11. The method as recited in clause 9, where the roofing accessory is a roofing underlayment.
12. The method as recited in clause 9, where the conductive material of the first fiber type includes copper.
13. The method as recited in clause 9, where the conductive material of the first fiber type includes aluminum.
14. The method as recited in clause 9, where the non-conductive material of the second fiber type includes glass fiber.
15. The method as recited in clause 9, where forming the roofing accessory includes spraying the radiofrequency shielding non-woven fiber composite material in uncured state onto the roof structure on material to coat roofing accessories on the roof structure.
16. The method as recited in clause 9, where predetermined percentage of electromagnetic radiation includes is ninety-nine percent.
17. A roofing system including:
a plurality of shingles, where each shingle includes:
a radiofrequency radiation shielding non-woven fiber composite material including;
a first fiber type including a conductive material;
where the radiofrequency shielding non-woven fiber composite material has an amount of the first fiber type causing, when the radiofrequency shielding non-woven fiber composite material is positioned on a roof structure, the radiofrequency shielding non-woven fiber composite material to allow for shielding a percentage of electromagnetic radiation passing through the roof structure;
a second fiber type;
where the second fiber type includes a non-conductive material; and
wherein the first fiber type and the second fiber type are dispersed within the radiofrequency shielding non-woven fiber composite material.
18. The roofing system as recited in clause 17, further including a plurality of first fibers of the first fiber type;
where the plurality of first fibers are in a mesh configuration, a cage configuration, or any combination thereof, including pores based on a density of the plurality of first fibers.
19. The roofing system as recited in clause 17, further including a roofing underlayment; where at least one shingle of the plurality of shingles is installed on the roofing underlayment.
20. The roofing system as recited in clause 17, where a density of the first fiber type is substantially uniform through at least one shingle of the plurality of shingles.

While one or more embodiments of the present disclosure have been described, it is understood that these embodiments are illustrative only, and not restrictive, and that many modifications, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. An article comprising:
a roofing membrane configured to be positioned on a roof structure;
wherein the roofing membrane consists of:
a single layer, wherein the single layer comprises:
a binder;
a first non-woven fiber type dispersed in the binder;
wherein the first non-woven fiber type comprises a conductive material;
wherein the roofing membrane has a sufficient amount of the first non-woven fiber type so as to result, when the roofing membrane is positioned on the roof structure, in the roofing membrane allowing for shielding a predetermined percentage of electromagnetic radiation passing through the roof structure; and
a second non-woven fiber type dispersed in the binder;
wherein the second non-woven fiber type comprises a non-conductive material; and
wherein the second non-woven fiber type is configured to provide structural reinforcement;
wherein the first non-woven fiber type and the second non-woven fiber type are mixed so as to be randomly dispersed within the binder of the single layer.

2. The article as recited in claim 1, wherein the conductive material of the first non-woven fiber type comprises copper.

3. The article as recited in claim 1, wherein the conductive material of the first non-woven fiber type comprises aluminum.

4. The article as recited in claim 1, wherein the non-conductive material of the second non-woven fiber type comprises glass fiber.

5. The article as recited in claim 1, wherein the predetermined percentage of electromagnetic radiation is ninety-nine percent.

6. A method comprising:
providing a first non-woven fiber type comprising a conductive material, a second non-woven fiber type comprising a non-conductive material, and a binder;
forming a roofing membrane that a single layer, wherein the single layer comprises a mixture of the first non-woven fiber type, the second non-woven fiber type, and the binder:

wherein the second non-woven fiber type is configured to provide structural reinforcement;

wherein the first non-woven fiber type and the second non-woven fiber type are mixed so as to be randomly dispersed within the binder; and wherein the roofing membrane has a sufficient amount of the first non-woven fiber type so as to result, when the roofing membrane is positioned on a roof structure, in the roofing membrane allowing for shielding a predetermined percentage of electromagnetic radiation passing through the roof structure.

7. The method as recited in claim 6, wherein the conductive material of the first non-woven fiber type comprises copper.

8. The method as recited in claim 6, wherein the conductive material of the first non-woven fiber type comprises aluminum.

9. The method as recited in claim 6, wherein the non-conductive material of the second non-woven fiber type comprises glass fiber.

10. The method as recited in claim 6, wherein the predetermined percentage of electromagnetic radiation is ninety-nine percent.

11. A roofing system comprising:

a roof deck;

a plurality of shingles installed on the roof deck; and a roofing underlayment installed on the roof deck, wherein the roofing underlayment consists of:

a single layer, wherein the single layer comprises:

a binder;

a first non-woven fiber type dispersed in the binder;

wherein the first non-woven fiber type comprises a conductive material;

wherein the roofing underlayment has an amount of the first non-woven fiber type causing, when the roofing underlayment is positioned on a roof structure, for the roofing underlayment to allow for shielding a percentage of electromagnetic radiation passing through the roof structure;

a second non-woven fiber type dispersed in the binder;

wherein the second non-woven fiber type comprises a non-conductive material; and wherein the second non-woven fiber type is configured to provide structural reinforcement;

wherein the first non-woven fiber type and the second non-woven fiber type are mixed so as to be randomly dispersed within the binder of the single layer, wherein the roofing underlayment is between the roof deck and at least some of the plurality of shingles, wherein at least some of the plurality of shingles contact the single layer, wherein the single layer contacts the roof deck.

12. The roofing system of claim 11, further comprising a plurality of first non-woven fibers of the first non-woven fiber type;

wherein the plurality of first non-woven fibers are in a mesh configuration, a cage configuration, or any combination thereof, comprising pores based on a density of the plurality of first non-woven fibers.

13. The roofing system of claim 11, wherein a density of the first non-woven fiber type is substantially uniform throughout the roofing underlayment.

* * * * *